June 18, 1963
W. E. PFEFFER
3,094,659
PERMANENT MAGNET ROTOR TYPE ELECTRIC METER
WITH MAGNETIC ZERO SET
Filed Nov. 4, 1960
4 Sheets-Sheet 2
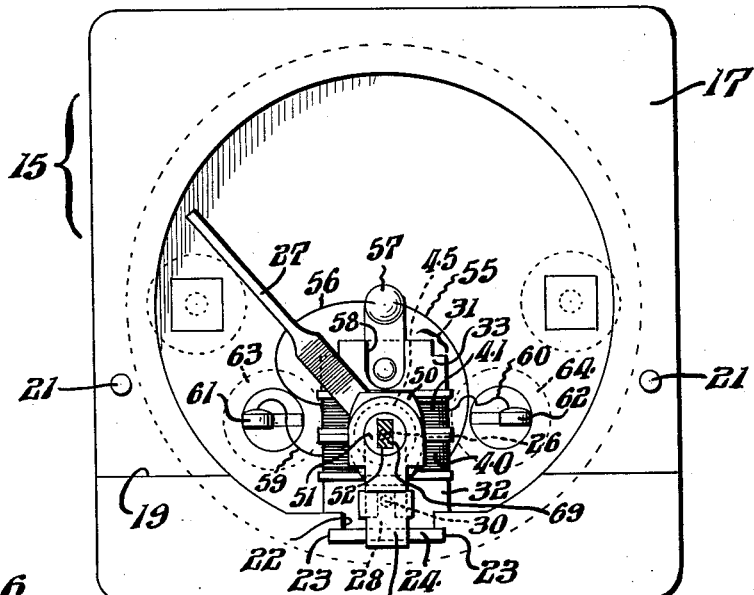
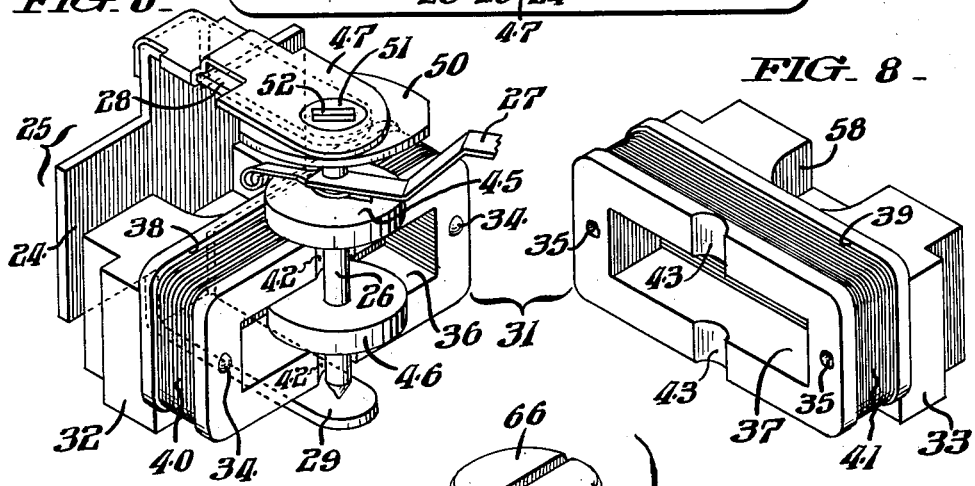
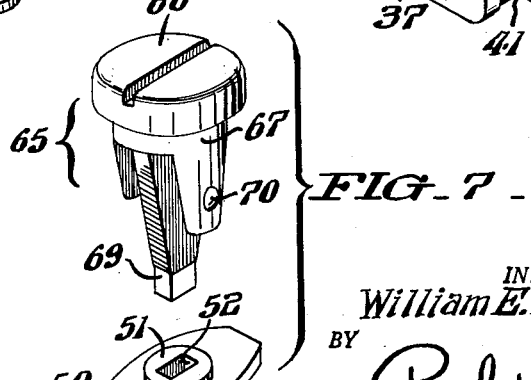
INVENTOR.
William E. Pfeffer,
BY
Paul & Paul
ATTORNEYS.

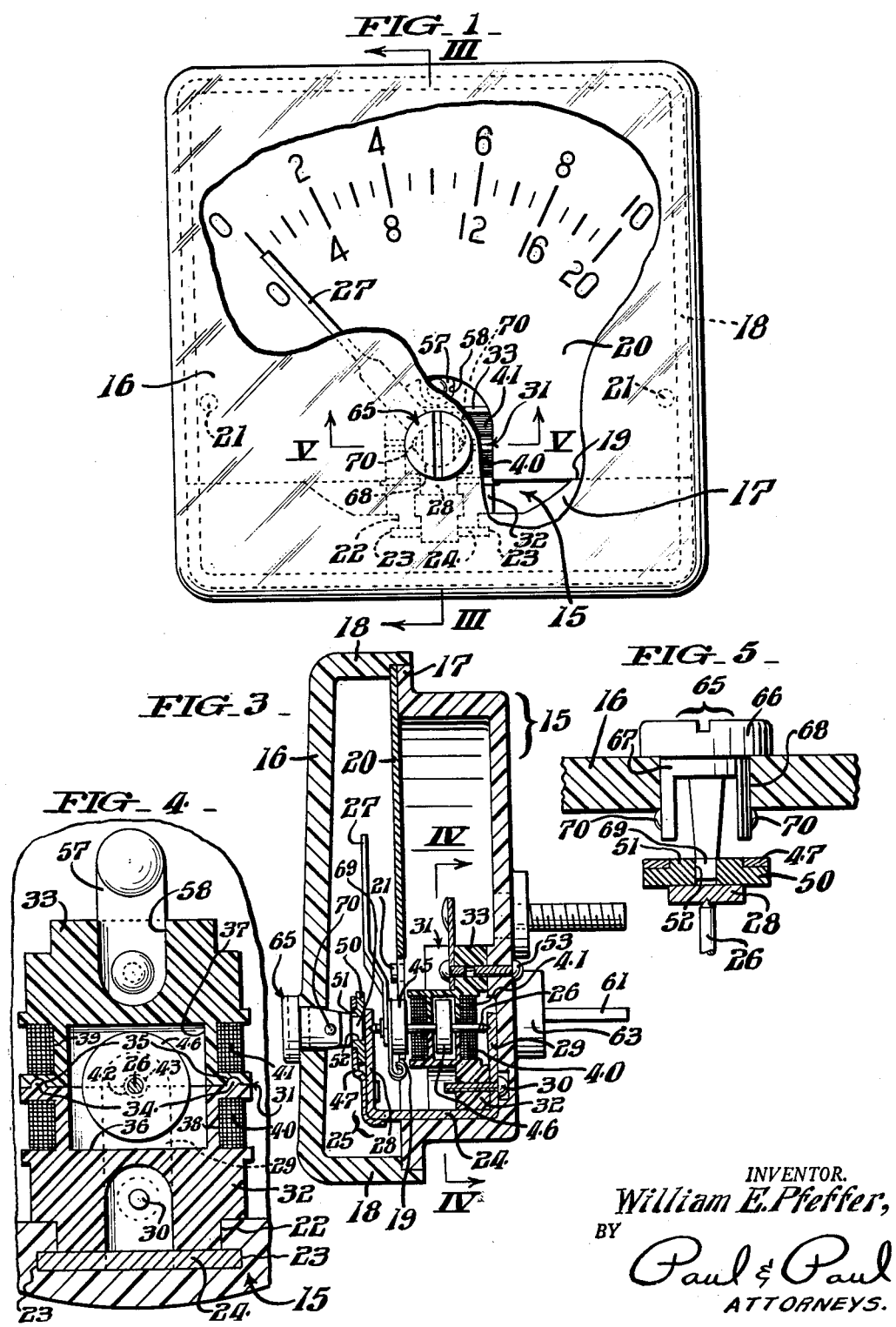

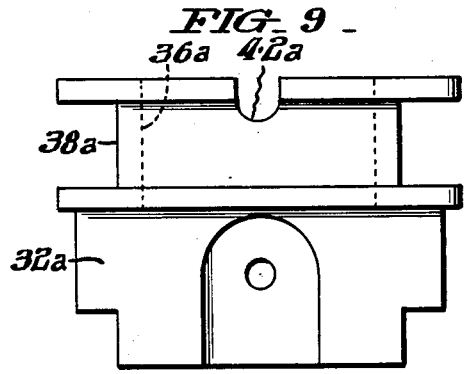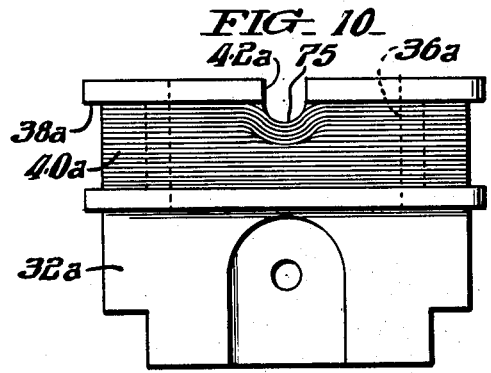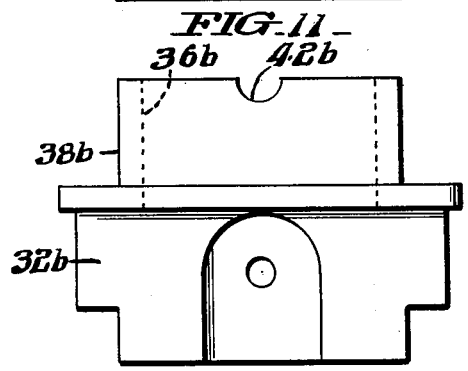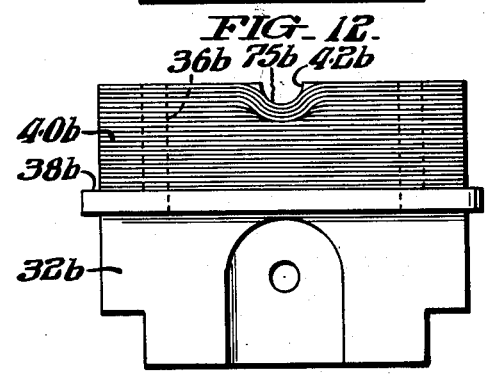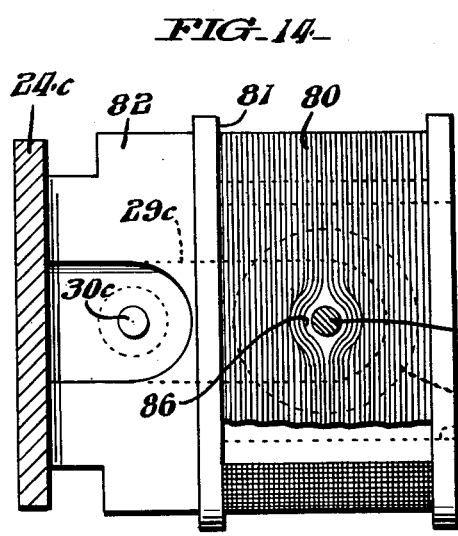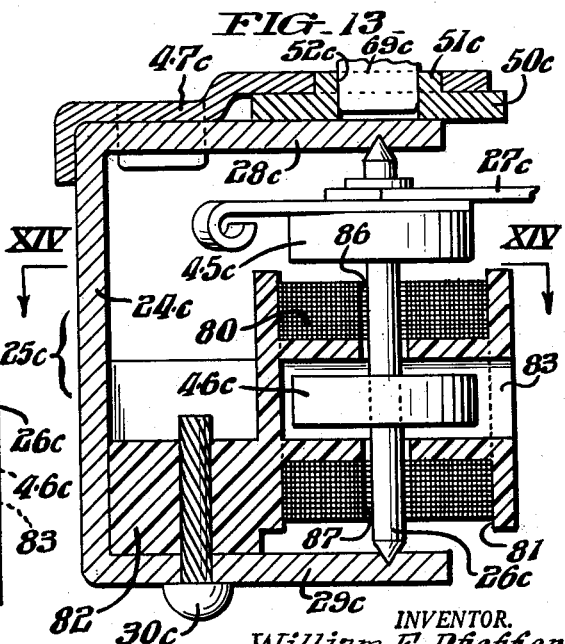

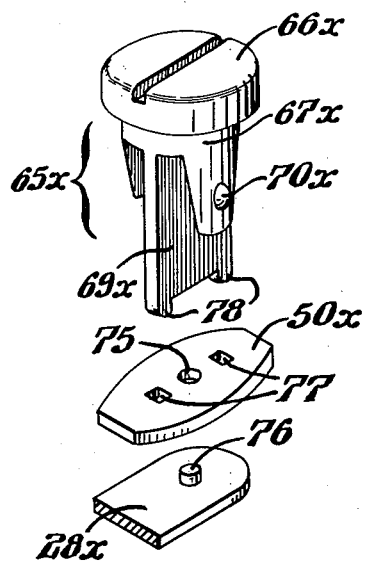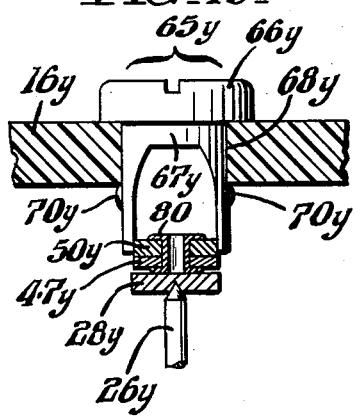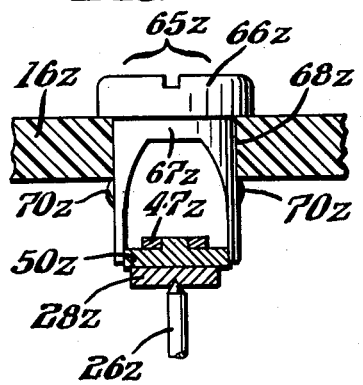

3,094,659
PERMANENT MAGNET ROTOR TYPE ELECTRIC
METER WITH MAGNETIC ZERO SET
William E. Pfeffer, Perkasie, Pa., assignor to Electro-Mechanical Instrument Co., Perkasie, Pa.
Filed Nov. 4, 1960, Ser. No. 67,248
2 Claims. (Cl. 324—146)

This invention relates to an electrical measuring instrument of the volt or ammeter type.

The chief aim of my invention is to provide an instrument of a kind referred to which is simple in construction; which is dependable for the accuracy of its readings; which is produceable from relatively inexpensive materials; and of which the essential working parts are few in number and easily and quickly assembled into a unit for subsequent insertion as such into the casing of the instrument.

In connection with an electrical measuring instrument having the aforementioned attributes, it is a further aim of my invention to provide an equally simple and easily incorporated adjusting means by which the indicating pointer can be accurately set to the zero position of a graduated scale on the dial of the instrument.

Other objects and attendant advantages will appear from the following detailed description of the attached drawings, wherein:

FIG. 1 shows the front view of an electrical measuring instrument embodying my invention in one form, with a portion of the front of its casing broken out;

FIG. 2 shows the instrument with the frontal or cover component of the casing removed;

FIG. 3 is a vertical section taken as indicated by the angled arrows III—III in FIG. 1;

FIGS. 4 and 5 are fragmentary detail views in section taken respectively as indicated by the angled arrows IV—IV and V—V in FIGS. 3 and 1;

FIG. 6 is a perspective view of an assemblage of the working parts of the instrument;

FIGS. 7 and 8 are perspective views of various parts of the instrument more particularly referred to hereinafter;

FIGS. 9, 10 and 11, 12 show modifications of one of the parts;

FIG. 13 is a fragmentary view in section of a modified preassembled unit incorporating the working parts of the instrument;

FIG. 14 is a sectional view taken as indicated by the angled arrows in FIG. 13; and FIGS. 15, 16 and 17 are detail views showing other modified parts of the instrument.

As exemplified in FIGS. 1–3, the electrical measuring instrument of my invention comprises a casing having a hollow main or rear component 15 and a frontal cover component 16. The main or rear component 15 of the casing is molded or otherwise fashioned to cup-like configuration from a dielectric plastic, preferably of an opaque type, and at its open end is provided with a rectangular flange 17. The frontal or cover component 16 of the casing is pressed or otherwise fashioned from transparent material, likewise preferably of plastic, to quadrangular configuration and is perimetrically flanged and recessed as at 18 in FIG. 3, to engage over the flange 17 of the rear component 15 with a snug friction fit. Above a transverse line 19, the face of the flange 17 of the component 15 is depressed slightly to accommodate, between it and the cover component 16, a graduated dial plate 20 which, in its lower corners, is provided with perforations for engaging over allocating studs 21 projecting from the flange face of the rear component 15. Centrally of the bottom of its hollow, the rear casing component 15 has an inwardly extending slot 22 which is undercut at opposite sides as at 23.

Engageable into the slot 22 in the rear casing component 15 with a force fit is the widened bottom web 24 of a U-shaped bracket 25 struck from suitably stiff non-magnetizable sheet metal. The opposite pointed ends of an arbor 26, carrying a pointer 27 for coordination with the graduations on the dial plate 20, are engaged in bearing indentations respectively at the inner sides of the upstanding legs 28 and 29 of the bracket 25. Disposed in the rear corner of the bracket 25, and there secured to the upstanding leg 29 by a screw 30 (FIG. 3), is a transversely arranged block 31 of insulation, said block being formed in this instance in two parts 32 and 33, these being separately illustrated in FIGS. 6 and 8 and being substantially duplicates of each other. As shown in FIG. 4, the part 33 is superposed invertedly upon the part 32, proper registry being assured by engagement of spot projections 34 on the latter with correspondingly allocated spot indentations 35 on the former. Eventually, as later on explained, the parts 32 and 33 are permanently united, as for example by means of cement, along the plane mutual abutment. It will be noted that the block parts 32 and 33 are horizontally elongated, hollowed out respectively as at 36 and 37, and provided with flanged perimetric grooves 38, 39 for reception and retention of coil sections 40 and 41, and are notched respectively as at 42—42 and 43—43. Affixed to the arbor 26 in spaced relation, are two permanently magnetized disks 45 and 46, the disk 45 immediately behind the pointer 27 and forward of the coils 40 and 41, and the disk 46 further to the rear. As best shown in FIG. 4, the disk 46 extends to equal distances into a clearance space jointly provided by the complemental hollows 36 and 37 of the parts 32 and 33, and the pointer arbor 26 is cleared in voids jointly formed by the complemental recesses 42 and 43 in said parts. It is to be understood, of course, that the arbor 26 is installed prior to the application and affixation of the part 33 upon the part 32. Suitably attached to the leg 28 of the bracket 25 at the front is an ear piece 47, the upper portion of which is outwardly offset slightly as best seen in FIGS. 3 and 5, for reception between it and said bracket leg of a permanently magnetized vane 50 (separately illustrated in FIG. 7) adapted to react with the disk magnet 45 restoring the pointer 20 to zero position on the dial 20. As best seen in FIGS. 3, 5 and 6, the vane 50 has a hub projection 51 rotatively engaged in a bearing aperture in the ear piece 47 in coaxial relation to the arbor 26, said hub projection being diametrally slotted as at 52. As a consequence of the described construction, it will be apparent that the essential working ports of the instrument can be preassembled into the form of a unit capable of subsequent insertion as such, into the hollow of the main or rear casing component 15. Except for application of the block 33 this unit is shown completely assembled in FIG. 6. After the unit, so preassembled, is set into the casing component 15 and secured by the screw 53, the leads 55 and 56 respectively of the coil sections 40 and 41 are soldered to a metallic finger 57 set into a recess 58 in the block section 33, the other leads 59 and 60 of said coils being soldered respectively to the inner ends of terminal prongs 61 and 62 fixedly anchored in bosses 63 and 64 at the back of the rear casing component 15. It is to be understood that, in this way, the two coil sections 40 and 41 are connected in series.

For the purpose of adjusting the vane 50 I have provided a stud 65 (separately illustrated in FIG. 7) which may be of plastic, said stud having a manipulating knob 66, a diametrically split shank 67 engageable into a bearing aperture 68 in the cover component 16 of the casing aligned in the axis of the pointer arbor 26 as shown in FIGS. 3 and 6, and a central tongue 69 whereof the end is flattened and engageable into the slot 52, in the hub 51 of the restoring magnet vane 50. The prongs of the split shank 67 of the vane 50 are formed laterally with rounded projections 70. In applying the stud 65, the shank thereof 67 is thrust into the aperture 68 in the casing cover 16, the split ends thereof yielding to permit the projections 70 to clear. By the springing action of the split shank 67, the projections 70 finally snap behind the cover component 16 when the stud 65 is fully pressed into place.

In the operation of the instrument, the flux set up incident to electric current flow in the two coils 40 and 41 which, due to being connected in series, act as one, in reacing upon the disk 46 on the arbor 26 causes the pointer 27 to be moved across the dial 20 as will be readily understood. Initially, or as may be necessary at times thereafter, the zero position of the pointer 27 can be accurately determined by adjusting the stud 65 to turn the magnetic restoring vane 50 slightly in one direction or the other to cause, by its reaction upon the magnetic disk 46 on the arbor 26, a corresponding shift of the pointer 27, as will be readily understood likewise.

In FIG. 9 is illustrated a modified coil supporting block part 32a in which the notches 42a are cut somewhat deeper than the corresponding notches 42 of the block 32 in FIG. 6. As a consequence, some of the windings of the corresponding coil section 41a can be depressed as 75 in FIG. 10 to insure proper clearance for the pointer arbor. In all other respects the modified block part of FIGS. 9 and 10 is identical with the block part of FIG. 6 and therefore, in order to obviate the necessity for repetitive description, all of the other corresponding features have been identified here by the same reference numerals previously employed with the addition however, in each instance, of the letter "a" for convenience of more ready distinction. In this connection it is to be understood that the companion coil support or block part to be used with the part 32a is similarly modified.

The modified block part 32b shown in FIGS. 11 and 12 is identical, in turn, with block part of FIGS. 9 and 10 except for the omission of the top terminal flange of the groove for the coil section 40b being depressed as at 75b for arbor clearance. Here again, it is to be understood that the mating block part to be used with the part 32b is similarly constructed.

In the alternative embodiment illustrated in FIGS. 13 and 14 there is but one coil 80 which is wrapped within a flanged groove 81 of a single block 82 of dielectric material, said block being hollowed out as at 83 to clear the permanently magnetized disk 46c and provided with clearance apertures in the regions of which some of the central windings of the coil are roundly displaced as at 86 and 87 to clear the pointer arbor 26c. As shown in FIG. 13 the block 82 is secured in the rear corner of the metallic U-shaped bracket 25c by a screw 30c and, as in the first described embodiment, and the pointed ends of the pointer arbor 26c are rotatively borne in spot indentations in the legs 28c and 29c of said bracket. Here also, as in the first described embodiment, a restoring magnet vane 50c is interposed between the outwardly offset portion of an ear piece 47c and the leg 28c of bracket 25c and has its hub boss 51c rotatively borne in an aperture in said ear piece. In preassembling the insert unit of this alternative embodiment the disk 46c is first introduced into the hollow 83 of the block 82, and the arbor 26c, with the pointer 27c and the disk 45c already attached, is thrust through the block and the disk 46c which is thereupon made fast to the arbor. Then, as the block 82 is introduced between the legs of the bracket, said legs are sprung for reception of the ends of the arbor 28c in their spot indentations as in FIG. 13. With this accomplished, the block 82 is secured finally to the bracket 25c by means of the screw 30c and the insert is thus completely preassembled for introduction into the rear casing component of the instrument in the same manner as described hereinbefore in connection with the first embodiment.

FIG. 15 shows a modified means for adjusting the restoring magnet vane which is here designated 50x. In this instance, the vane 50x has a central hole 75 for pivotal engagement with a stud 76 on the bracket leg 28x and is provided moreover with a pair of aligned apertures 77 equidistant radially from the hole 75 for engagement by spaced projections 78 at the distal end of the tongue 69x of the adjusting stud 65x, which latter is otherwise like that of FIG. 7, it having a bifurcated shank 67x with rounded studs 70x for engaging behind the cover of the instrument, and a manipulating head 66x.

In the modification illustrated in FIG. 16, the restoring vane 50y is pivotally connected by a grommet 80 to the ear piece 47y. The bifurcated shank 67y of the stud 65y is rotatively engaged in the casing cover 16y, as in the first described embodiment, and is provided with a manipulating head 66y and also with rounded retaining projections 70y on its shank 67y, but here, the restoring vane 50y is straddled by the bifurcate ends of said shank. Thus, as the stud 65 is adjusted, corresponding rotative movements are imparted to the vane 50y.

The modification of FIG. 17 is generally similar to that of FIG. 16, the restoring vane 50z being straddled by the bifurcations of the split shank 67z of the adjusting stud 65z which latter, as in the previous instances, has a manipulating head 66z and rounded projections 70z for retaining it in the casing cover 16z. Here, however, the restoring vane 50z is engaged between the bracket leg 28z and the ear piece 47, as in the first described embodiment.

While in accordance with the provisions of the statutes, I have illustrated and described the best forms of embodiment of my invention now known to me, it will be apparent to those skilled in the art that changes may be made in the forms of the apparatus described without departing from the spirit and scope of the invention as set forth in the appended claims, and that in some cases certain features of my invention may be used to advantage without a corresponding use of other features.

Having thus described my invention, I claim:

1. In an electrical measuring instrument, a casing having a hollow cup-like integrally formed rear component of dielectric plastic having a rearwardly extending undercut slot in the bottom of its hollow, and a transparent cover component: a preassembled insert comprising a U-shaped bracket of which the crossbar is slidable longitudinally into the undercut slot in the rear component of the casing, a hollow block of dielectric material secured to the bracket crosswise in the interval between the upstanding legs of the latter, a horizontally arranged vertical axis coil wound about said block, an arbor with a pointer thereon, for coordination with graduations on a dial within the casing, said arbor having its opposite ends rotatively supported in the upstanding legs of the U-shaped bracket at right angles to the coil axis, a permanently magnetized disk affixed to the arbor and extending into the hollow of said block, and a headed screw of which the shank is passed through the rear component of the casing and threadedly engages into the dielectric block to secure the unit in place.

2. In an electric measuring instrument having a casing with a transparent cover through which a graduated dial is visible, a pair of hollow coils transversely disposed within the casing, an arbor disposed between the coils and pivotally supported at opposite ends by a non-magnetizable bracket and having a pointer thereon for coordination with the dial, a permanently magnetized disc on the arbor extending to equal disstances into the hollows of the coils, a second permanently magnetized disc on the arbor above the coils, and a permanently magnetized vane having a slotted hub rotatively supported in the aforesaid bracket in coaxial relation with the arbor: means whereby the vane can be adjusted from the exterior of the instrument for reaction with the flux of the second disc on the arbor to set the pointer at zero on the dial, said means comprising a non-metallic stud having a manipulating knob and a bifurcated shank engaged through the front of the casing, the bifurcations of said shank being flexible and provided with rounded spot projections thereon adapted to snap behind the back of the casing cover to hold the stud in place, said stud also having a flattened central rearward projection for engaging into the slot of the hub of the aforesaid vane.

References Cited in the file of this patent

UNITED STATES PATENTS 2,970,267     Pfeffer _____ Jan. 31, 1961